United States Patent [19]

Mackey et al.

[11] 3,861,924

[45] Jan. 21, 1975

[54] IMPROVEMENT IN VISCOSITY OF GELATIN SOLUTIONS FOR PHOTOSENSITIVE MATERIALS

[75] Inventors: E. Scudder Mackey; Michael Dervay, both of Binghamton, N.Y.

[73] Assignee: GAF Corporation, New York, N.Y.

[22] Filed: Feb. 9, 1973

[21] Appl. No.: 331,244

[52] U.S. Cl............... 96/114, 96/67, 96/87 A, 96/94 R, 96/114.2, 96/114.4, 252/500
[51] Int. Cl.............................................. G03c 1/72
[58] Field of Search...... 96/114, 114.2, 114.4, 94 R, 96/67, 87 A; 252/500

[56] References Cited
UNITED STATES PATENTS

| | | | |
|---|---|---|---|
| 2,725,297 | 11/1955 | Morey | 96/87 A |
| 3,241,969 | 3/1966 | Hart et al. | 96/114 |
| 3,260,598 | 7/1966 | Yutzy et al. | 96/76 R |
| 3,341,333 | 9/1967 | Klinger et al. | 96/114 |
| 3,357,832 | 12/1967 | Vrancken et al. | 96/114.4 |
| 3,754,924 | 8/1973 | DeGeest et al. | 96/67 |

*Primary Examiner*—J. Travis Brown
*Attorney, Agent, or Firm*—Walter C. Kehm; Samson B. Leavitt

[57] ABSTRACT

Photographic elements having a protective coating or photosensitive layer with improved viscosity characteristics and improved conductivity are provided by incorporating into a gelatin containing coating selected hydrophilic polymers and a soluble inorganic fluoride salt. The elements thus improved conventionally contain a support, one or more photographic silver halide layers and one or more protective layers. This improved composition may be, for example, a conventional silver halide emulsion formulated with gelatin and including the sodium salt of polystyrene sulfonate and ammonium fluoride, or a conventional protective overcoat composition with gelatin, the usual coating aids and hardeners and including the potassium salt of polystyrene sulfonate and ammonium silico fluoride.

10 Claims, No Drawings ial films, such as, for exam-
IMPROVEMENT IN VISCOSITY OF GELATIN SOLUTIONS FOR PHOTOSENSITIVE MATERIALS This invention relates to improved photographic materials and their preparation. In another aspect, it relates to a composition of matter which has been found to be particularly desirable as a high viscosity coating, such viscosity characteristics being a direct result of the incorporation of the additives of the invention.

Silver halide emulsion—polymer dispersions — as well as gelatin—polymer overcoat dispersions employed with photographic elements derive very favorable viscosity characteristics from the employment of the novel additives of this invention.

In the manufacture of photographic materials, the combined use of gelatin and selected hydrophilic polymers is well known and this combination has a number of valuable applications. Included among these applications are the preparation of emulsions by flocculation or coagulation. Many of these emulsions are described in the Patent Literature, for example in U.S. Pat. Nos. 2,728,662; 3,241,969; 3,679,425; and British Pat. Nos. 861,984; 884,840; 957,417 and 808,228.

Flocculated emulsions have been prepared by the addition of certain hydrophilic polymers to an aqueous gelatin solution into which selected silver halides have been dispersed. The mixture thus obtained is frequently subjected to pH control. For example, with certain combinations, when the pH is lowered to 5 or less, a complex consisting of hydrophilic polymer, gelatin and the silver halide salt present, is obtained through flocculation. If desired, this flocculated complex may be then washed and redissolved in water by raising the pH and warming, and in some cases, redispersion is accomplished without raising the pH.

Hydrophilic polymers used to form the above complexes are well known. Examples of some of these are polystyrene sulfonic acid and polyvinyl sulfonic acid, as well as a series of selected polymers and copolymers bearing carboxyl groups or sulfonic acid groups. A flocculated emulsion thus obtained is desirable when used with extrusion coaters.

Another method of obtaining a flocculated emulsion is by a simple salting out process, for example adding sodium sulfate to a dispersion of the silver halide in gelatin.

A method for upgrading the viscosity of emulsions in an alkaline medium, is disclosed in U.S. Pat. No. 3,220,864. This method involves the use of alcohol containing solutions and the addition of a dibisulfite of an alkylene or arylene diisocyanate to improve the viscosity characteristics.

While coatings of gelatin thus modified are useful, it has been found that they are not completely satisfactory. The viscosity attainable by the acidic coagulation and salting out methods is limited by the amount of polymer or salt that can practically be added. The use of flammable, non-aqueous solvents adds the further problems of expense and the necessity of using explosion-proof equipment. Generally, with these emulsions, a high grade, expensive gelatin of relatively high bloom strength is required.

The application of an emulsion or coating thus obtained to form a photographic element may be accomplished with the above-mentioned specialized coating equipment, such as that shown in U.S. Pat. Nos. 2,761,418; 2,761,419; 2,761,791 and 3,474,758.

In modern instrumentation films, such as, for example, X-ray films and in the multi-layer coaters previously referred to, used to produce these films, it is necessary to have both sensitized coatings and protective overcoat layers of increased viscosity to achieve uniform coatings. If the layers set too slowly or if the viscosity is too low, the coating, under the force imposed by the coaters, becomes non-uniform and discontinuous. Additionally, it is necessary to have coating emulsions which have a high enough viscosity to be useful as vehicles for carrying agents for the various types of dispersed particulate components used in photograph elements, such as silver halides, dyes, oil in water dispersions and the like.

It is, therefore, an object of this invention to provide both improved silver halide emulsions and improved protective overcoating compositions for application to photographic elements which will not be subject to one or more of the above disadvantages.

Another object of the invention is to provide photographic compositions with increased viscosity for coating from extrusion-type coaters.

It is a further object to provide modified gelatin compositions which are useful as vehicles or carrying agents for various types of dispersed particulate materials, such as silver halides, dyes, oil in water dispersions, and the like.

Yet another object of the invention is to provide gelatin-hydrophilic polymer dispersions with a preselected improved viscosity.

The attainment of the above objects is made possible by the present invention which comprises an improved composition for use as a coating in a photosensitive element, said composition containing gelatin and a hydrophilic polymer flocculating agent, the improvement comprising the employment of an inorganic fluoride salt viscosity builder selected from the group consisting of alkali metal and ammonium fluorides, bifluorides and silico fluorides.

The subject invention, employing a fluoride salt and selected hydrophilic polymers as additives to either a gelatin dispersion or solution or a silver halide-gelatin dispersion for use as a viscosity improver in coatings used in photographic elements, overcomes one or more of the disadvantages of the prior art heretofore described. This is accomplished with the advantage that such element may be more easily manufactured, has better anti-static properties, has a smooth, uniform coating thereon and can be made from cheaper grades of gelatin.

Broadly, in the practice of the instant invention, a fluoride salt and a selected hydrophilic polymer is added to a gelatin containing coating composition. This composition may be prepared by several techniques, depending upon the desired application.

Generally, if a photographic emulsion is utilized, the selected silver salts are incorporated into a gelatin solution in the usual manner; then, the gelatin-salt dispersion is coagulated, washed and redispersed. The novel additives of the invention may be added at different stages of the process, depending on the process used, to produce a final emulsion of high viscosity. If a simple gelatin overcoat solution is produced, no coagulation is employed. A brief summary of the major procedures involved follows:

I. Non-Coagulated

If a gelatin overcoat solution without silver halide is utilized, water is added to the gelatin to swell it, and the hydrophilic polymer and fluoride salt are added to the solution after the normal coating additives are incorporated. With this overcoat solution, no coagulation is employed.

II. Acid Coagulation

The hydrophilic polymer is added to the silver halide gelatin-dispersion, acid is added to coagulate the silver halide gelatin complex, the coagulum is redispersed and then the fluoride salt is added.

III. Salt Coagulation

The silver halide-gelatin dispersion is coagulated by the addition of ten to sixty-five parts by weight based on the weight of the gelatin of a water soluble inorganic salt such as sodium sulfate, the coagulum is washed to remove the soluble salts and redispersed, then, the hydrophilic polymer and the fluoride salt are added to improve the viscosity of the final emulsion.

For example, to prepare a photographic emulsion, a suspension of silver halide in an aqueous solution of gelatin is formed by a double decomposition reaction of selected silver salts which form silver halide in the gelatin dispersion, adding to this dispersion an aromatic sulfonate which is not surface active, but has a hydrophobic group in the anion, then adding acid to precipitate the gelatin phase containing the silver halide, separating the gelatin-sulfonate complex containing the silver halide, washing the separated complex to remove undesirable additives and reaction products, redispersing the complex in a liquid medium to form a photographic emulsion and adding the novel fluoride salts of this invention to increase the viscosity of the emulsion so formed. The final emulsion may also be formed by preparing an aqueous silver halide dispersion in gelatin and then mixing in enough of a selected water soluble inorganic salt, such as sodium sulfate, to salt out the components of the dispersion, whereby grains of silver halide enveloped by the gelatin are coagulated and precipitated, separating the grains from the supernatant liquid and redispersing them in an aqueous liquid, then adding the fluoride salt and hydrophilic polymer of the invention.

A more detailed method for producing photosensitive embodiments of the high viscosity emulsions of this invention follows.

The selected silver halide producing components are added to and precipitated in an aqueous dispersion having a gelatin concentration of about 0.2 to 15 percent by weight. From about 1 to 5 percent by weight, calculated on the weight of the gelatin employed, of a water soluble salt of a selected hydrophilic polymer or, in certain cases, the acid form of the polymer, is added. The water soluble salts of the polymer may be alkali metal salts, ammonium and amine salts and alkaline earth metal salts, for example, sodium, potassium, lithium, calcium and Cl-5 alkyl amine salts.

The pH value of the dispersion is then adjusted to 5 or less, preferably to about 3.5 to 5, by adding acid. The pH adjustment may be effected by inorganic and/or organic acids, such as for example, sulfuric acid, phosphoric acid, acetic acid, citric acid or toluene sulfonic acid, at temperatures of about 2° to 5° C. above the gelling temperature, for example 35° to 45° C. The emulsion thus treated precipitates and settles quickly. After coagulation, the liquid is decanted off, the precipitate is washed with water to remove any residual acid and undesirable reaction products. The washed precipitate is redispersed in warm water, either with or without alkaline pH adjustment to effect dissolution. The quantities of gelatin necessary for finally adjusting the emulsion ready for coating are then added. The emulsion is then ripened and, the usual additives, such as sensitizers, stabilizers and hardeners are added. Enough of an aqueous solution of the fluoride salt of this invention is added to give a concentration of from about 0.1 to 4.0 percent fluoride salt, based on the weight of gelatin, to increase the viscosity. The amount of fluoride salt that can be added is governed by limits of practicality. The viscosity increases rapidly up to about 2.0 percent and then drops slightly at 3.0 percent, thus making further addition uneconomical, even though larger amounts, for example 4.0 percent, may be added to achieve an improved viscosity. Further if too much salt is added the sensitometric qualities of the emulsion are adversely affected.

The hydrophilic polymer may be added conveniently as an aqueous solution. The aqueous solutions of hydrophilic polymer and fluoride salt may have any convenient concentration, subject to the limitation that these solutions must not be so dilute as to adversely affect the viscosity by excessive solvent addition. These two additives may be added dropwise or in bulk and added separately or mixed together before addition, depending on whether the method of coagulation requires the prior addition of the hydrophilic polymer. As previously stated, a protective overcoat solution requires no coagulation, and the additives may be incorporated at any time into the gelatin solution.

The gelatin which may be used with this invention is photographic gelatin commonly used in the art, preferably an acid modified gelatin of low-bloom strength (about 100 to 135), such as that marketed by Kind and Knox Co. The use of this invention allows utilization of cheaper grades of gelatin which ordinarily do not have viscosities high enough to provide high grade emulsions or adequate protective overcoatings. With regard to coagulation, the pH value at which coagulation occurs depends to some degree on the type of gelatin used, but this point is not critical and is easily ascertained by routine experimentation.

The fluoride salts that may be used with the invention are generally simple inorganic salts and are used in an amount of about 0.1 to 4.0 percent, based on gelatin solids. The preferred fluoride salts are those of the alkali metal fluorides including silico fluorides, ammonium fluoride, ammonium bifluoride and ammonium silico fluoride.

The polymeric hydrophilic additives of this invention may be of a number of different types.

A. Styrene sulfonate copolymers:

For example: The water soluble salt of a sulfonated copolymer consisting of 70 to 97 percent by weight, of styrene with 3 to 30 percent by weight of at least one other vinyl compound. The vinyl compounds that may be copolymerized with the styrene include monomers, such as acrylic acid, acrylic acid esters with aliphatic alcohols, acrylamide, acrylonitrile, methacrylic acid, methacrylic acid esters with aliphatic alcohols, methacrylamide, methacrylonitrile and N-vinyl 2-pyrrolidone. Generally, those sulfonated copolymers, which may be prepared by the methods described in U.S. Pat. Nos. 2,604,456; 2,533,210; 2,837,500 and 2,616,917, have an $SO_3H$ content of about 15 to 60 percent by weight.

B. Polystyrene sulfonates:

For example, polystyrene sulfonic acid or its salts. Polystyrene sulfonic acid, if used, can be prepared by a conventional sulfonation of polystyrene. Especially suitable are polystyrenes with a molecular weight between 500 and 30,000. These polystyrene sulfonic acids generally contain 1 to 3, but advantageously 2 sulfonic acid groups to 3 benzene nuclei.

C. Polymers having sulfonic acid-side groups comprising in their molecular structure recurring structural units of at least one of the following formulas:

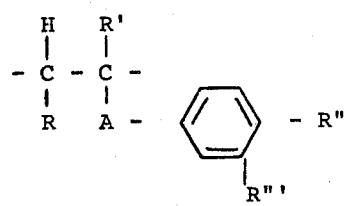

and

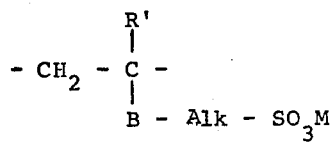

wherein

A is a

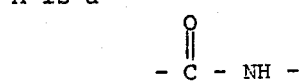

group, a

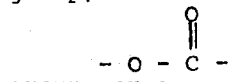

group, or a

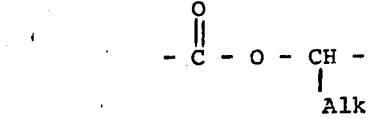

group,

B is a

group or a

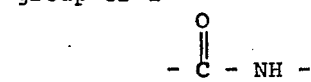

group,

R is a hydrogen atom or a carboxylic acid group.
R' is a hydrogen atom or a methyl group;
R'' and R''' independently represent a hydrogen atom, a sulfonic acid group or a salt thereof, at least one of R'' and R''' being a sulfonic acid group or a salt thereof;
Alk is a straight-chain or branched-chain alkyl group of 1 to 4 carbon atoms, and
M is a hydrogen atom, an alkali metal atom or an alkaline earth metal atom.

If the polymers or copolymers comprise units of the first formula, other hydrogen atoms of the phenyl nucleus may also be replaced by substituents such as a methoxy group:

When this polymer bearing sulfonic acid side-groups or salts thereof is added to the gelatin solution in the form of a salt such as a sodium or a potassium salt, it is necessary to acidify the mixture to obtain a precipitate. However, as previously stated, the polymer can be added to the gelatin solution in its acid form in an amount such that the pH of the gelatin solution is lowered sufficiently for the gelatin to precipitate immediately.

Polymers and copolymers bearing sulfonic acid sidegroups or salts thereof which are utilized according to the invention, include a. Polymers and copolymers of substituted acryl and methacrylamides of the formula:

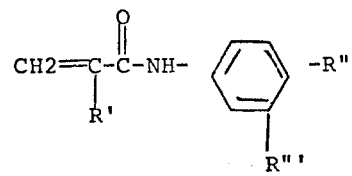

b. Polymers and copolymers of substituted acrylates and methacrylates of the formula:

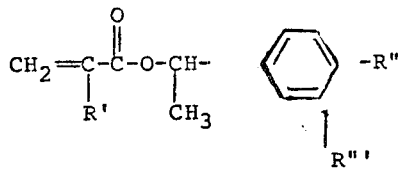

c. Polymers and copolymers of substituted vinyl esters of the formula:

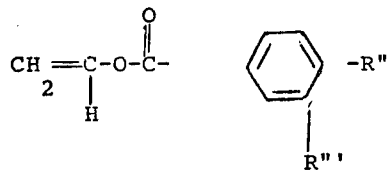

d. Copolymers of substituted maleamic acid of the formula:

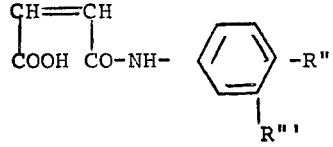

e. Polymers and copolymers of substituted acrylates and methacrylates of the formula:

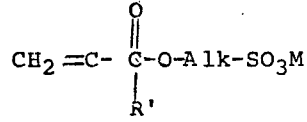

f. Polymers and copolymers of substituted acryl and methacrylamides of the formula:

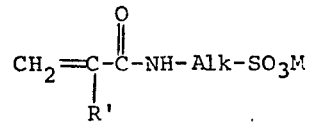

In these formulae, Alk, M, R', R'' and R''' have the same significance as set forth above.

The sulfoalkyl-substituted polyacrylates and polymethacrylates are obtained by reaction of polyacrylyl chloride or of polymethacrylylchloride with an hydroxyalkyl sulfonic acid.

The sulfoalkyl substituted polyacrylamides and polymethacrylamides are obtained by reaction of polyacrylyl chloride or of polymethacrylyl chloride with an aminoalkyl sulfonic acid.

In the two last cases under polyacrylyl chloride and polymethacrylyl chloride are included homopolymers of acrylyl chloride or of methacrylyl chloride as well as copolymers containing acrylyl chloride and methacrylyl chloride units.

The sulfoalkyl-substituted polyacrylates, polymethacrylates, polyacrylamides and polymethacrylamides can also be obtained by homopolymerization or copolymerization of the sulfoalkyl substituted acrylates, methacrylates, acrylamides and methacrylamides.

Generally, with any of the hydrophilic polymer additives of this invention, the pH at which precipitation occurs depends on different factors among which the concentration of soluble salts is of great importance. A precipitate is usually obtained at a pH between 3.5 and 5.

The particular support material used in the invention is not critical though desirably the support material should be firm, stable, inert and preferably flexible. The following materials are suitable support materials: cellulose nitrate film, cellulose ester film, polyvinyl acetal film, polystyrene film, polyethylene terephthalate film and other polyester film, as well as glass, paper, metal, wood and the like. Supports such as paper which are coated with alpha-olefin polymers, particularly polymers of alpha-olefins containing two or more carbon atoms, as exemplified by polyethylene, polypropylene, ethylenebutane copolymers, and the like, give good results. The above materials are, of course, only illustrative and not limiting, as other materials having the desired properties can be used. Further, it is contemplated that other suitable support materials may be employed. As before mentioned, the support can be coated on either or both sides.

Any of the gelatin photographic silver halide emulsions can be employed in practicing this invention, including, for example, photographic silver halide emulsions used in X-ray and camera films and the like. Suitable photographic emulsions contain silver halides such as silver chloride, silver bromide, silver bromoiodide, silver chloroiodide, silver chlorobromide and the like.

The photographic emulsions used in the elements described herein can be chemically sensitized with compounds of the sulfur group, noble metal salts such as gold salts, reduction sensitized with reducing agents, and combinations of these.

The photographic silver halide emulsions can also contain further additives, particularly those known to be beneficial in photographic emulsions. For example, the emulsion can contain speed increasing compounds, such as quaternary ammonium salts, polyalkylene glycols, thioethers, and the like. The photographic silver halide emulsions can be stabilized with mercury compounds, azaindenes, quaternary benzothiazolium compounds, hydroxy substituted aromatic compounds, and the like.

The photographic silver halide elements described herein can contain light absorbing dyes in the emulsion layer or in an auxiliary layer such as a layer coated between the support and the emulsion layer or the light absorbing dyes can be included in both the emulsion and the auxiliary layer.

The photographic silver halide emulsions disclosed herein can also contain selected non-ionic, anionic and/or amphoteric coating aids. Some useful coating aids include, for example, saponin, alkyl substituted aryloxy alkylene ether sulfonates of the type described in U.S. Pat. No. 2,600,931, maleopimarates of the type described in U.S. Pat. No. 2,823,123, taurine derivatives of the type described in U.S. Pat. No. 2,739,891 and alkyl amino-propionates of the type described in U.S. Pat. No. 3,133,816.

The emulsions and photographic elements described herein can contain incorporated developing agents such as polyhydroxy benzenes, aminophenols and 1,3-pyrazolidones. The photographic emulsions can also contain spectral sensitizers such as cyanines, merocyanines, complex (trinuclear) cyanines and complex (trinuclear) merocyanines, styryls and hemicyanines. These emulsions can be blue sensitive emulsions or they can be orthochromatic, panchromatic or X-ray emulsions.

The silver halide layers, gelatin overcoat or other layers in the photographic elements of this invention can also contain plasticizers or lubricating materials such as long chain fatty acids, silicone resins, N-alkyl B amino propionates, palmityl palmitate, and the like. Further, the emulsion layers and other layers present in photographic elements made according to this invention can be hardened with any suitable hardener such as aldehyde hardeners, aziridine hardeners, hardeners which are derivatives of dioxane, oxypolysaccharides such as oxystarch, oxy plant gums, inorganic hardeners such as chromium salts, hardeners having reactive vinyl groups such as the vinyl sulfonyl ethers and the like.

The photographic element is prepared in the conventional manner by coating the support with the emulsion and overcoat layers in the sequence required to give the desired photographic element layer combination. Coating methods are fully described in U.S. Pat. Nos. 2,761,419; 2,761,791 and 3,474,758.

The following examples will more fully illustrate the embodiments of this invention. All parts and proportions referred to herein and in the appended claims are by weight, unless otherwise indicated.

EXAMPLE 1

The following formulation is used for viscosity determinations:

| Part I | |
|---|---|
| $H_2O$ | 3,000 ml. |
| KI | 22 g. |
| $NH_4Br$ | 680 g. |
| Gelatin | 42 g. |

Water is added to the gelatin, to swell it. This is allowed to stand for ½ hour. The balance of the water is then added and the temperature raised to 50°C. The KI and the $NH_4Br$ are then added slowly with stirring.

| Part II | |
|---|---|
| $H_2O$ | 2,400 ml. |
| $AgNO_3$ | 330 g. |
| $NH_3$ 28% | 300 ml. |

The NH₃ is added to the water, and the AgNO₃ is then added slowly with stirring to the solution.

Part II is added to Part I at 60° C in such a manner as to provide an average crystal size of 1.6 microns and less than 35 percent dispersion of the crystal size. 10cc of a 10 percent aqueous solution of polystyrene sulfonate sodium salt of molecular weight of 1,500 is added dropwise, with stirring, to the above dispersion. The emulsion is neutralized with sulfuric acid and the complex flocculated by the dropwise addition of dilute acetic acid. The coagulation is complete at a pH of 4.1. The supernatant liquid is decanted off and the coagulum washed three times with cold water. The coagulum is redispersed in water by stirring and heating. Additional gelatin solution is then added to make up a final volume of three liters containing 5% total gelatin solids by weight. Heating and stirring are continued, and the final coating dispersion is then prepared by adding 0.5 percent by weight of the total dispersion of nonylphenoxy polyethyleneoxy ammonium sulfate having 4 ethylene oxide moieties per molecule as described in U.S. Pat. No. 3,026,202.

One-half of this dispersion is set aside, and to the other half 10.5 cc of a 10 percent solution of ammonium fluoride is added dropwise, with stirring. Viscosity readings are made after one hour, at a temperature of 40° C, using the capillary flow technique in a Saybolt pipette viscosimeter. The viscosimeter measurements are comparative, using the same size orifice:

Control sample viscosity—164 seconds
Sample containing ammonium fluoride —206 seconds

EXAMPLE 2

The following formulation is used for viscosity determinations:

| Part I | |
|---|---|
| H₂O | 3,000 ml. |
| KI | 30 g. |
| KBr | 725 g. |
| Gelatin | 65 g. |

Water is added to the gelatin to swell it. This slurry is allowed to stand until the gelatin is swollen. The remainder of the water is then added and the temperature raised to 70°C to dissolve the gelatin. The KI and the KBr are then added slowly, with stirring.

| Part II | |
|---|---|
| H₂O | 3,000 ml. |
| AgNO₃ | 350 g. |
| NH₃ (28%) | 285 ml. |

The NH₃ is added to the water and the AgNO₃ is then added slowly, with stirring, to the solution until a clear solution is obtained.

Part II is added to Part I at 50° C in such a manner as to provide an average crystal size of 1.2 microns and less than 30 percent dispersion of the crystal size.

20% of the above dispersion is flocculated with a sodium salt of polystyrene sulfonate of molecular weight of about 800. 0.6 percent by weight of the sulfonate, based on the weight of gelatin, is added to achieve flocculation. This dispersion is then neutralized with sulfuric acid and the complex flocculated, washed and redispersed in exactly the same manner as Example 1.

The remainder of the dispersion, that is, 80 percent of the original, is flocculated by the salting out technique in the following manner. At a temperature of 60°C, 2,500 g. of crystalline sodium sulfate is slowly added. The material that has been dispersed then coagulates and settles out of solution. The supernatant liquid is decanted and the coagulum washed with cold water until the majority of sodium sulfate is removed from the precipitate. The precipitate is then redispersed by dissolving it in water with heat and agitation. This portion of the original solution coagulated by sodium sulfate is then admixed with the prior portion of the original solution coagulated with the above described polystyrene sulfonate. The mixture is then brought up to a final volume of 5 liters with a solution containing enough gelatin to produce a total gelatin solids content of 7 percent by weight. 3 percent by weight based on the total dispersion weight of sodium N-cyclohexyl N-palmitoyl taurate, as described in U.S. Pat. No. 2,739,891 is then added with continued agitation and heating. The solution is then divided into two equal portions. To one portion is added sodium fluoride in a concentration of 0.5 percent, based on gelatin solids. The solutions are allowed to stand for 1 hour at 40°C and viscosity readings are made using the same technique as in Example 1.

Control emulsion blend viscosity—93 seconds
Emulsion blend containing 0.5% sodium fluoride—103 seconds

EXAMPLE 3

The following formulation is used for viscosity determinations:

Part I 10 g. of gelatin
20 g. of KBr
2 ml. of 10% of KI solution
120 ml. of water The solution of Part I is prepared in the same manner as in Example I.

Part II 20 ml. of NH₃ (26%)
60 ml. of water
20 g. of AgNO₃

This solution is prepared in the same manner as Example 1.

Both solutions are heated to 50°C. The solution from Part II is added slowly into the solution of Part I over a period of 7 minutes. The mixture is then stirred for another 10 minutes, and 150 g. of sodium sulfate is added to flocculate the emulsion. The supernatant liquid is decanted and the precipitate washed several times with cold water to remove the major portion of the sodium sulfate. The precipitate is then redispersed by adding a solution of 35 g. of gelatin in 750 ml. of water at 50°C. The emulsion is ripened at the same temperature for one hour. It is then cooled to 40°C and 1.8 percent by weight based on the total dispersion weight of the sodium nonyl phenoxy polyethyleneoxy ethanol sulfate ester having 4 ethylene oxide moieties per molecule is added with agitation and continued heating. This coating solution is separated into four equal parts. To one part of the solution is added 0.6 percent by weight, based on the weight of gelatin of ammonium silico fluoride. To a second portion is added 1.0 percent of the sodium salt of the sulfonated copolymer of vinyl pyrrolidone and styrene and 0.5 percent ammonium silico fluoride. Both percentages are by weight, based on the weight of gelatin. To a third portion is added 1.0 percent of the sodium salt of a sulfonated copolymer of vinyl pyrrolidone and styrene. The fourth portion is used as a control. After standing for one hour, the coating solutions are tested for viscosity at 40°C, using a capillary flow technique as described in Example 1. The synergistic effect of ammonium silico fluoride and the sulfonated copolymer in increasing viscosity can be readily observed.

| | | |
|---|---|---|
| Control viscosity | — | 93 seconds |
| Solution with sulfonated copolymer only | — | 118 seconds |
| Solution with sulfonated copolymer and ammonium silico fluoride | — | 135 seconds |
| Solution with ammonium silico fluoride only | — | 88 seconds |

EXAMPLE 4

The following formulation is used for viscosity determinations.

Part I 1,100 ml. of water
1.2 g. of KI
130 g. of KBr
19 g. of gelatin

The solution is prepared in the same manner as in Example 1.

Part II 160 g. of AgNO$_3$
1,200 ml. of water

Both solutions are heated to 60°C, and solution two is slowly added to solution one over a period of 60 minutes, with stirring. This solution is flocculated by sodium sulfate and redispersed in the same manner as described in Example 3. To this redispersed solution, 165 ml. of a 5% weight aqueous solution of sodium cellulose sulfate (commercial Kelco SCS-XL, a product marketed by Kelco Co., San Diego, California) is added. This solution is divided into two equal portions. To one portion is added 0.5 percent ammonium fluoride, based on gelatin solids. The other portion is the control. After one hour holding time at 40°C, the following viscosities are obtained in exactly the same manner as in Example 1:

Control solution viscosity—135 seconds
Solution with amonium fluoride—180 seconds

EXAMPLE 5

The following formulation is used for viscosity determinations. This formulation is an overcoat for a silver halide emulsion layer. A Kind and Knox gelatin, having a bloom strength of 100, is used. 50 g. of this gelatin is swollen and dispersed in the usual manner in 5 liters of water. 3 percent by weight based on the total solution weight, of the taurate compound described in Example 2 is added. 1 percent by weight based on the gelatin weight, of the sodium salt of sulfonated polystyrene, having a molecular weight of 2,000, is then added to the solution, and the solution is divided into three portions. To one of these portions, 0.5 percent by weight of ammonium fluoride, based on the weight of gelatin, is added. After 1 hour, at 40°C the viscosity of the coating solutions is determined in the same manner as in Example 1. The synergistic effect of the ammonium fluoride and the sulfonated polystyrene is readily noted as follows: ,260

EXAMPLE 6

The following formulation is used for vicosity determinations:

| Part I | |
|---|---|
| H$_2$O | 3,000 ml. |
| KI | 22 g. |
| NH$_4$Br | 680 g. |
| Gelatin | 42 g. |

Water is added to the gelatin, to swell it. This is allowed to stand for ½ hour. The balance of the water is then added and the temperature raised to 50°C. The KI and the NH$_4$Br are then added slowly with stirring.

| Part II | |
|---|---|
| H$_2$O | 2,400 ml. |
| AgNO$_3$ | 330 g. |
| NH$_3$ 28% | 300 ml. |

The NH$_3$ is added to the water, and the AgNO$_3$ is then added slowly with stirring to the solution.

Part II is added to Part I at 60°C in such a manner as to provide an average crystal size of 1.6 microns and less than 35 percent dispersion of the crystal size. 10 cc of a 10 percent aqueous solution of polystyrene sulfonate sodium salt of molecular weight of 1,500 is added dropwise, with stirring, to the above dispersion. The emulsion is neutralised with sulfuric acid and the complex flocculated by the dropwise addition of dilute acetic acid. The coagulation is complete at a pH of 4.1. The supernatant liquid is decanted off and the coagulum washed three times with cold water. The coagulum is redispersed in water by stirring and heating and additional gelatin solution added to make up a final volume of three liters containing 5 percent total gelatin solids by weight. Heating and stirring are continual, and the coating dispersion is then prepared by adding 1.5 percent by weight based on the total dispersion weight of the nonylphenoxy polyethyleneoxy ethanol having 4 ethylene oxide moieties per molecule sulfate ester sodium salt.

This dispersion is divided into three equal portions. One portion is set aside, and to the second portion 0.4 percent of ammonium fluoride, based on the weight of gelatin is added, to the third portion 0.4% of ammonium chloride, again based on the weight of gelatin, is added. The additions are made dropwise with stirring. Viscosity readings are made after one hour, at a temperature of 40°C, using the technique of example one. The viscosimeter measurements are comparative, using the same size orifice:

| | | |
|---|---|---|
| Control Sample viscosity | — | 165 seconds |
| Sample containing 0.4% ammonium fluoride | — | 203 seconds |
| Sample containing 0.4% ammonium chloride | — | 143 seconds |

Thus it can be seen that ammonium fluoride does not perform in the same way as other ammonium halides such as ammonium chloride. The fluoride produces an increased viscosity; the chloride on the other hand actually slightly depresses the viscosity.

EXAMPLE 7

The following formulation is used for conductivity determinations:

| Part I | |
|---|---|
| H$_2$O | 3,000 ml. |
| KI | 22 g. |
| NH$_4$Br | 680 g. |
| Gelatin | 42 g. |

Water is added to the gelatin, to swell it. This is allowed to stand for ½ hour. The balance of the water is then added and the temperature raised to 50°C. The KI and the NH$_4$Br are then added slowly with stirring.

| Part II | |
|---|---|
| H$_2$O | 2,400 ml. |
| AgNO$_3$ | 330 g. |
| NH$_3$ 28% | 300 ml. |

The NH$_3$ is added to the water, and the AgNO$_3$ is then added slowly with stirring to the solution.

Part II is added to Part I at 60°C in such a manner as to provide an average crystal size of 1.6 microns and less than 35 percent dispersion of the crystal size. 10cc of a 10 percent aqueous solution of polystyrene sulfonate sodium salt of molecular weight of 1,500 is added dropwise, with stirring, to the above dispersion. The emulsion is neutralized with sulfuric acid and the complex flocculated by the dropwise addition of dilute acetic acid. The coagulation is complete at a pH of 4.1. The supernatant liquid is decanted off and the coagulum washed three times with cold water. The coagulum is redispersed in water by stirring and heating and additional gelatin solution added to make up a final volume of three liters containing 5% total gelatin solids by weight. Heating and stirring are continued, and the final coating dispersion is then prepared by adding 0.5 percent by weight of saponin.

One-half of this dispersion is set aside and to the other half 1.4 percent of ammonium fluoride based on the weight of gelatin in the emulsion is added dropwise, with stirring. Conductivity readings are made after one hour at a temperature of 40°C and 50 percent relative humidity using a surface electrode method identical to the one described in U.S. Pat. No. 2,801,191, except that a Southwestern Industrial Electronics Co. Resistance meter Model C-3 was used. Results are as follows:

| | |
|---|---|
| Control sample resistivity | 3.0 × 10$^4$ ohms/cm$^2$ |
| 1.4% ammonium fluoride containing sample | 0.8 × 10$^4$ ohms/cm$^2$ |

Thus, it is seen that the coating containing the fluoride salt has about three and one-half times the conductivity of the control thus reducing static problems.

EXAMPLE 8

The following formulation is used for viscosity determinations:

Part I 3 grams of silver nitrate are dissolved in
900 cc of water and
300 cc of ammonia solution (28%) are added.

Part II 300 grams of gelatin
300 grams of potassium bromide, and
30 cc of 10% aqueous potassium iodide solution are dissolved in
1800 cc of water. The mixture is then heated to 40°C.

A portion of the water is added to the gelatin to swell it. This is allowed to stand for one-half hour. The balance of the water is then added, then the other ingredients of Part II are added.

Part I is added to Part II over a period of about 5 minutes. After stirring for another 10 minutes 30 grams of a 50 percent by weight aqueous solution of sodium polystyrene sulfonate is added and the mixture is cooled to about 35°C. The emulsion is approximately neutralized with about 280cc of 25 percent sulfuric acid and then flocculated out by adding acetic acid dropwise. The coagulation is complete at a pH of 4.0. The clear liquid is decanted off and the coagulum washed three times with cold water. The coagulum is redispersed in 1,500 cc of water at 40°C. A solution of 300 grams of gelatin in 4,500 cc of water is added thereto and the emulsion is ripened for about 60 minutes at 50°C. The emulsion is divided into seven equal parts for subsequent comparative halide salt addition. Halide salts are added in varying amounts to each of the separate portions of the emulsion and viscosities are then determined in exactly the same manner as described in Example I. The conditions of addition and viscosities are reported in the following table:

| | Halide Salt Addition | | | |
|---|---|---|---|---|
| | Concentration of Aqueous Solution | Concentration in Emulsion based on gelatin weight | Viscosity seconds (1 hour) | Viscosity Seconds 4 hour Holding |
| Control | — | — | 129.4 | 137.0 |
| Ammonium Fluoride | 10% | 0.5% | 153.6 | 166.8 |
| Ammonium Fluoride | 10% | 1.0% | 193.0 | 211.6 |
| Ammonium Fluoride | 20% | 2.0% | 186.3 | 196.2 |
| Ammonium Fluoride | 30% | 3.0% | 155.0 | 164.0 |
| Ammonium Fluoride | 40% | 4.0% | 146.2 | 155.2 |
| Ammonium Iodide | 10% | 0.5% | 124.0 | 142.5 |
| Ammonium Bromide | 10% | 0.5% | 129.7 | 133.6 |
| Ammonium Chloride | 10% | 0.5% | 126.5 | 134.4 |

It can be seen that the addition of fluoride salt provides a positive advantage over the addition of other halide salts. Viscosities are measured after one hour, at 40°C at ambient conditions. These results are reported in the table above. Viscosities are also measured after a four hour holding period at 40°C and ambient conditions. It is found that the viscosity in all cases increases slightly and results are substantially the same within ± 5 percent experimental error.

This invention has been described with respect to certain preferred embodiments and various modifications and variations thereof will become obvious to persons skilled in the art, and are to be included within the spirit and purview of this application and the scope of the appended claims.

What is claimed is:

1. In a composition for use as a coating in an improved photosensitive element, said composition containing gelatin and a hydrophilic polymer flocculating agent bearing a carboxyl or sulfonic acid group dispersed in an aqueous medium, the improvement comprising:
   the employment of an inorganic fluoride salt viscosity builder selected from the group consisting of alkali metal and ammonium fluorides, bifluorides and silico fluorides.

2. A composition as defined in claim 1, wherein said inorganic fluoride salt is employed in an amount of about 0.1% to 4% by weight based on the weight of said gelatin.

3. A composition as defined in claim 1, wherein said hydrophilic polymer flocculating agent is selected from the group consisting of styrene sulfonate copolymers, polystyrene sulfonates, and other polymers having sulfonic acid side groups and comprising in their molecular structure at least one recurring structural unit selected from the group consisting of

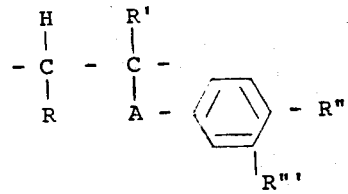

and

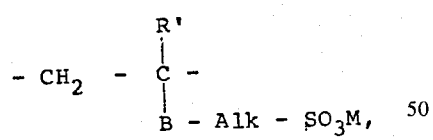

wherein
A is a radical selected from the group consisting of

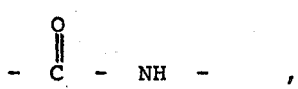

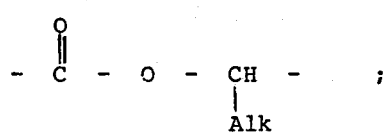

B is a radical selected from the group consisting of

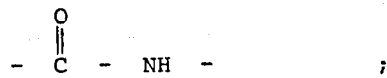

R is a radical selected from the group consisting of hydrogen and carboxylic acid;
R' is a radical selected from the group consisting of hydrogen and methyl;
R'' and R''' are independently selected from the group consisting of hydrogen, sulfonic acid and sulfonic acid salt, at least one of R'' and R''' being sulfonic acid or sulfonic acid salt;
Alk is a $C_{1-4}$ alkyl group and
M is a radical selected from the group consisting of hydrogen, alkali metal and alkaline earth metal.

4. A photographic element comprising a support and at least one layer thereon of a composition as defined in claim 1, wherein said composition contains a photosensitizing amount of a silver halide.

5. A photographic element comprising a support, at least one photosensitive silver halide layer thereon, and at least one overcoat layer of a composition as defined in claim 1.

6. A method for increasing the viscosity characteristics of a coating composition containing gelatin and a hydrophilic polymer flocculating agent dispersed in an aqueous medium, comprising
adding thereto an effective amount of an inorganic fluoride salt viscosity builder as defined in claim 1.

7. A process for the production of a photographic silver halide emulsion comprising:
dispersing silver halide in an aqueous gelatin medium and forming a gelatin emulsion from said dispersion in the presence of a hydrophilic polymer selected from the group consisting of styrene sulfonate copolymers, polystyrene sulfonates, and other polymers having sulfonic acid side groups and comprising in their molecular structure at least one recurring structural unit selected from the group consisting of

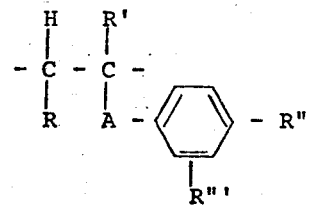

and

wherein
A is a radical selected from the group consisting of

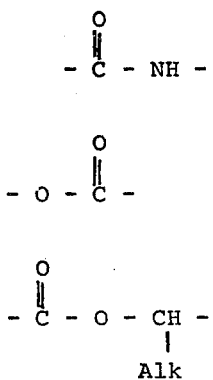

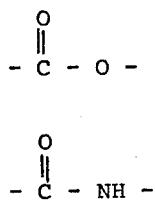

B is a radical selected from the group consisting of $$-\overset{O}{\underset{\|}{C}}-O-\quad\text{and}$$

$$-\overset{O}{\underset{\|}{C}}-NH-\quad;$$

R is a radical selected from the group consisting of hydrogen and carboxylic acid;

R' is a radical selected from the group consisting of hydrogen and methyl;

R'' and R''' are independently selected from the group consisting of hydrogen, sulfonic acid and sulfonic acid salt, at least one of R'' and R''' being sulfonic acid or sulfonic acid salt;

Alk is a $C_{1-4}$ alkyl group and

M is a radical selected from the group consisting of hydrogen, alkali metal and alkaline earth metal; and an inorganic fluoride salt viscosity builder selected from the group consisting of alkali metal and ammonium fluorides, bifluorides, and silico fluorides.

8. A process as defined in claim 7 said forming step comprising adding a hydrophilic polymer as defined in claim 7 to the aqueous silver halide, gelatin dispersion, adjusting the pH of the resulting dispersion to coagulate the dispersion to form a coagulum of said silver halide, gelatin and hydrophilic polymer, redispersing said coagulum in an aqueous medium to form an emulsion, and adding an inorganic fluoride salt as defined in claim 7 to said emulsion to increase the viscosity.

9. A process as defined in claim 7, said forming step comprising adding an effective amount of a water soluble inorganic salt to said dispersion to salt out a coagulum of silver halide gelatin, redispersing said coagulum in an aqueous medium to form an emulsion and adding a hydrophilic polymer and an inorganic fluoride salt as defined in claim 7 to said emulsion to increase the viscosity.

10. A process for preparing an improved overcoat composition comprising dispersing gelatin in water, adding the hydrophilic polymer flocculating agent and the inorganic fluoride salt as defined in claim 7 to form a coagulum and redispersing said coagulum to form a coating composition with high viscosity.

* * * * *